United States Patent [19]

Genaro et al.

[11] 4,368,359

[45] Jan. 11, 1983

[54] WALL TELEPHONE STAND

[75] Inventors: Donald M. Genaro, Haworth, N.J.;
Richard G. Klier, Greenfield, Ind.
John N. McGarvey, Drexel Hill, Pa.;
Warren R. Tolman, Greenfield, Ind.

[73] Assignee: Bell Telephone Laboratories, Incorporated, Murray Hill, N.J.

[21] Appl. No.: 214,669

[22] Filed: Dec. 9, 1980

Related U.S. Application Data

[63] Continuation of Ser. No. 30,724, Apr. 17, 1979, abandoned.

[51] Int. Cl.³ .................................. H04M 1/04
[52] U.S. Cl. .................................. 179/146 R
[58] Field of Search ............. 179/146 R, 147, 100 R, 179/100 C, 179; D14/56, 61

[56] References Cited

U.S. PATENT DOCUMENTS 1,606,388 11/1926 Scharringhausen ............ 179/146 R
3,845,252 10/1974 Wooters ........................ 179/146 R
3,862,375 1/1975 Thomas ........................ 179/100 R

FOREIGN PATENT DOCUMENTS 557350 2/1957 Italy ............................ 179/146 R Primary Examiner—Thomas A. Robinson
Attorney, Agent, or Firm—H. L. Newman

[57] ABSTRACT

A wall telephone stand is disclosed that includes facilities for both displaying messages and for storing a telephone directory. The stand comprises a support member adapted to be mounted to a wall, a housing secured to the support member, and a display member secured to the housing. The housing includes a handset cradle on one side and a storage compartment open to the other side, while the display member includes a display panel surrounded by a frame. The manner of assembly is such that the user can select on which side of the stand the handset cradle is situated and the type of display panel and style of frame to be used.

18 Claims, 7 Drawing Figures

WALL TELEPHONE STAND

This application is a continuation of application Ser. No. 030,724 filed Apr. 17, 1979, and now abandoned.

FIELD OF THE INVENTION

This invention relates to wall telephone stands and within that field to a wall telephone stand including both display and storage facilities.

BACKGROUND OF THE INVENTION

In the use of one's telephone, it is often necessary to refer to the telephone directory. It is, therefore, advantageous to be able to store the directory in some location adjacent to the telephone. With a desk telephone, the directory can be kept on the same surface on which the telephone is supported or in a drawer adjacent to the surface. But a wall telephone may, in fact, be remote to such a storage space for the directory. And while it is possible to suspend the directory from a hook or the like mounted on the wall, this detracts from the appearance of the room.

In the use of a telephone, it is also often necessary to leave messages relating to telephone calls. It is, therefore, advantageous to have a pad of paper or other writing surface and the means to write on the surface proximate to the telephone. With a desk telephone, even though it lacks a message display surface, at least a writing surface and a writing implement can be conveniently kept on the same support on which the telephone rests. A wall telephone, on the other hand, may again be remote from such a support.

SUMMARY OF THE INVENTION

A wall telephone stand in accordance with the present invention solves these problems in that it includes facilities for both displaying messages and for storing a telephone directory. More particularly, a wall telephone stand embodying the present invention includes a housing having a handset cradle on one side and a telephone directory storage compartment open to the other side. Face portions that provide the front and the rear surfaces of the housing are generally planar and each includes identical pairs of vertically spaced slots adjacent to its side edges. The slots in one face portion serve to mount the housing on a support member that is secured to a wall, while the slots on the other face portion serve to mount a display member comprising a frame and a panel, such as a chalkboard or a corkboard, to the housing. The top surface of the housing includes a wall for storing an eraser and chalk for use with a chalkboard or a pad of paper and pencil for use with a corkboard.

Because the slots on the face portions of the housing are identical, the housing can be assembled to the support member and the display member in either of two positions. In one position, the handset cradle is on the left and the storage compartment opens to the right, and in the other position, the handset cradle is on the right and the storage compartment opens to the left. The means for assembling the housing to the support member and the display member to the housing is such that the user of the telephone stand can readily assemble the combination with the housing in whichever position is most convenient.

Furthermore, the manner in which the panel and the frame of the display member are assembled together is such that the user of the telephone stand can readily change the panel and/or the frame of the display member. Because the display member is situated on the front of the telephone stand and the panel is essentially neutral, the frame serves as a dominant visual feature of the stand. Therefore by selecting a frame having the appropriate color, texture, and shape, the user is able to impart to the telephone stand a character that is compatible with the surrounding decor whether it be contemporary, traditional, early American, or anything else.

DETAILED DESCRIPTION

Figure 1:
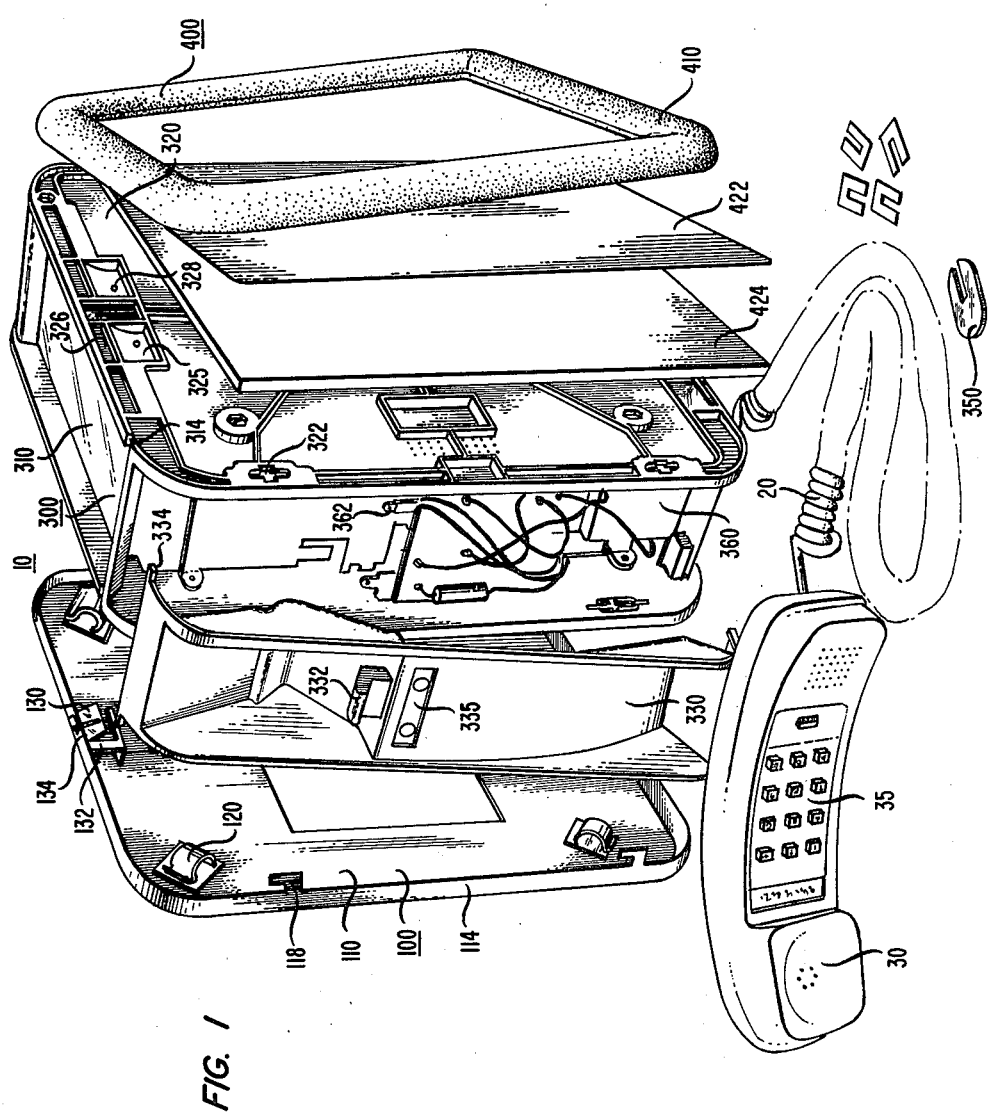
FIG. 1 is an exploded perspective view of a wall telephone set in accordance with the present invention consisting of a handset supported on a stand comprising a suport member, housing, and display member.

Referring to FIG. 1 of the drawing, a wall telephone set in accordance with the present invention comprises a stand 10 electrically connected by a cord 20 to a handset 30, the handset advantageously being of the type that includes a dial 35. The stand 10 consists of a support member 100, a housing 300, and a display member 400.

Figure 2:
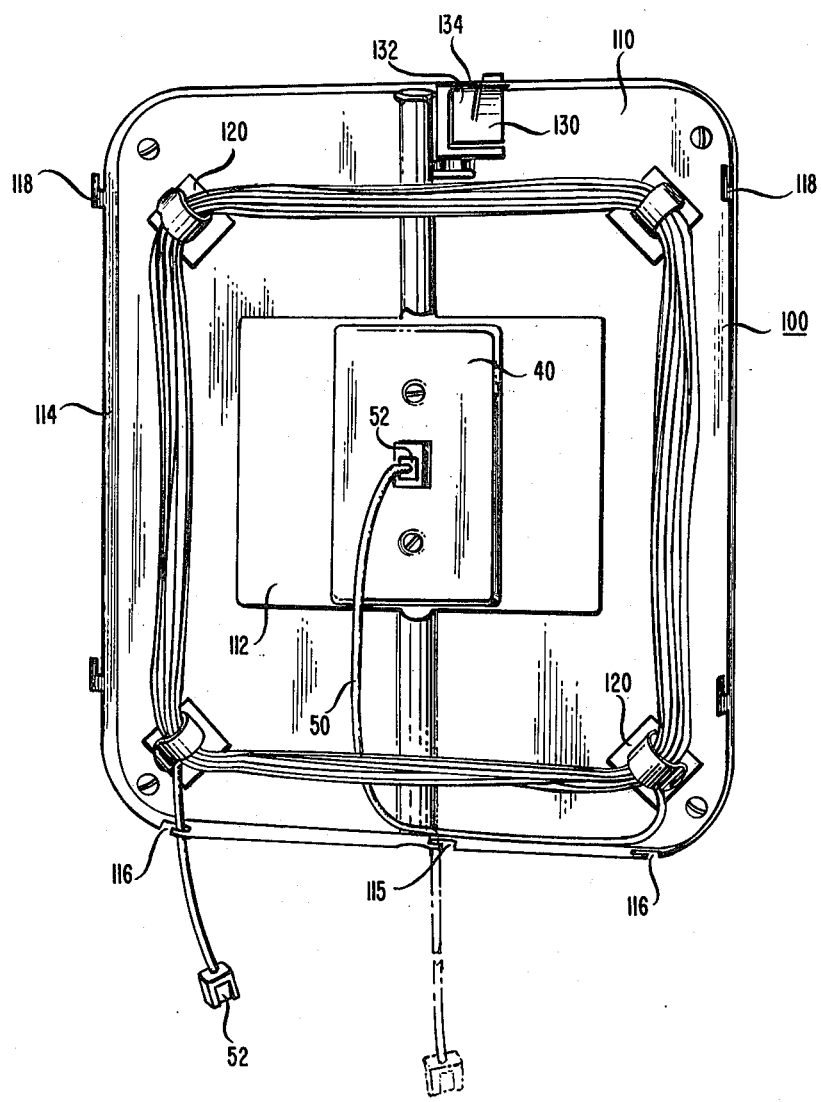
FIG. 2 is a perspective view of the support member mounted to a wall.

As shown in FIG. 2, the support member 100 comprises a rectangular wall plate 110 having an opening 112 in its middle and a forwardly extending rim 114 disposed about its circumference. The opening 112 is of a size to accommodate a standard wall telephone outlet 40, and when this outlet is present, the wall plate 110 is advantageously fastened to the wall with the outlet positioned within the opening since the outlet provides a ready connection to a telephone line.

With or without the outlet 40, the telephone set is connected to an outside telephone line by means of a line cord 50 having a modular plug 52 at each end. The plug 52 on one end of the cord 50 is either connected to a socket in the wall telephone outlet 40 or to a socket in a floor-level telephone outlet (not shown). In the latter case, the end of the cord 50 passes through either a center notch 115 or a side notch 116 in the bottom of the rim 114. The plug 52 on the other end of the cord is connected to a socket 338 (FIG. 3) in the housing 300, and that end of the cord is passed through one of the side notches 116 of the rim 114. Any slack in the line cord 50 is taken up by wrapping the cord around four plastic spring clips 120 joined to the wall plate 110 adjacent to its corners.

The rim 114 of the wall plate 110 also includes a pair of spaced L-shaped hooks 118 extending forwardly from each side portion of the rim, the hooks in each pair being in vertical alignment with one another. In a manner hereinafter described, the hooks 118 are used to mount the housing 300 on the support member 100 while a spring latch 130 joined to the wall plate 110 locks the housing in place.

Figure 3:
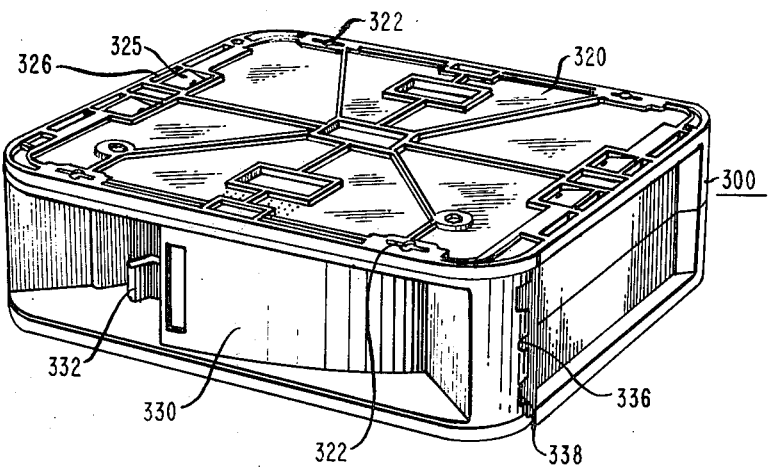
FIG. 3 is a perspective view of the housing positioned with the handset cradle located on the left side of the housing.
Figure 4:
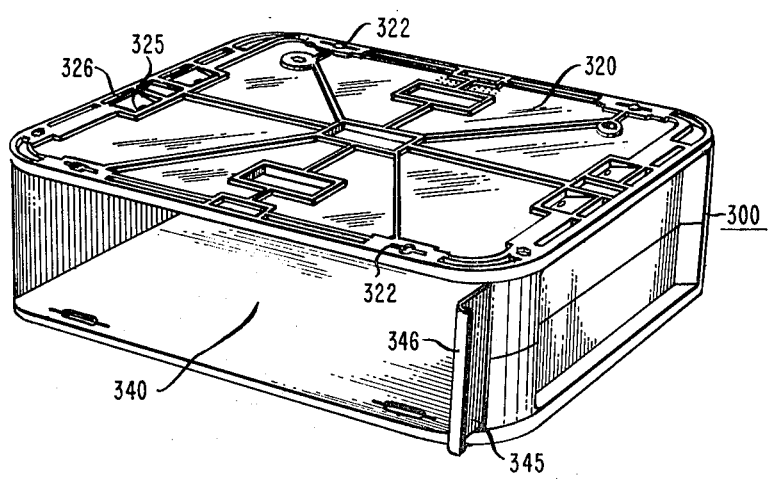
FIG. 4 is a perspective view of the housing positioned with a directory storage compartment open to the left side of the housing.

Turning now to FIGS. 1, 3, and 4, the housing 300 comprises a box-like structure including a storage well portion 310 that provides the top surface, a pair of face portions 320 that provide the front and rear surfaces, a cradle portion 330 at one side and a storage compartment 340 that opens to the other side.

Figure 5:
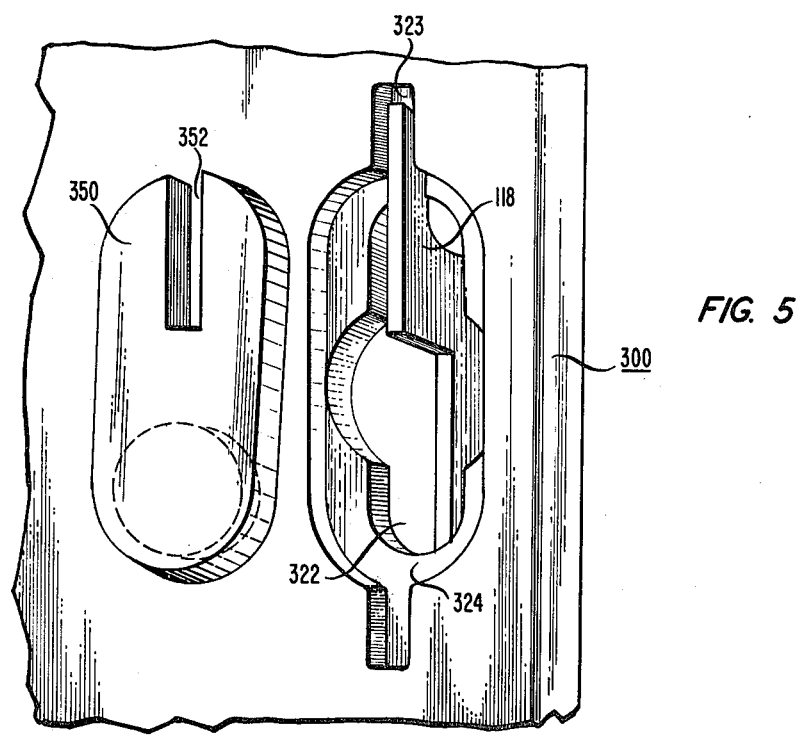
FIG. 5 is an enlarged partially exploded perspective view showing how the housing is mounted on the support member and showing a plug that is used to lock the housing in place.

Each face portion 320 includes four slots 322, the spacing of which is identical to the spacing of the hooks 118 (FIG. 2) of the support member 100. In addition, as shown in FIG. 5, each slot 322 has a double-ended keyhole shape in that the upper and lower ends of the slots are narrower than an enlarged circular center portion. Each slot 322 is of a size to permit the vertical leg of a hook 118 to pass through it. Furthermore, the interior surface surrounding each slot 322 has a grooved portion 323 above the slot that is adapted to receive the vertical leg of a hook 118.

Thus, the housing 300 is mounted on support member 100 (FIG. 2) by positioning the housing in front of the support member with the slots 322 in one of the face portions 320 in registration with the hooks 118. The housing 300 is then moved against the support member 100, resulting in the slots 322 moving past the vertical legs of the hooks 118. Therefore, the housing 300 is moved downwardly, moving the grooved portion 323 above the slots 322 behind the vertical legs of the hooks 118 to thereby secure the housing to the support member 100.

Since the slots 322 in each face portion 320 of the housing 300 are identical, it is seen that the housing can be mounted on the support member 100 either oriented as it is shown in FIG. 3 or oriented as it is shown in FIG. 4. Consequently, the cradle portion 330 can be on either the left or the right, whichever is most convenient, with of course the storage compartment 340 opening to the opposite side.

While the hooks 118 of the support member 100 serve to secure the housing 300 to the support member, they do not lock the housing 300 in place. This is accomplished by two separate means to assure that the housing 300 is not inadvertently dislodged once it has been mounted in place.

Referring to FIGS. 1 and 2, the first lock is provided by the interaction of the spring latch 130 of the support member 100 with a ramp 325 and a recess 326 in the adjacent face portion 320. The spring latch 130 includes a cantilever arm 132 having a forwardly extending tongue 134 at its free end. The tongue 134 is deflected rearwardly by the ramp 325 when the housing 300 is moved downwardly after having been positioned over the vertical legs of the hooks 118. Then when the housing 300 is fully seated on the hooks 118, the tongue 134 is in registration with the recess 326, and it moves forward into the recess to lock the housing in place. To release the spring latch 130 it is necessary to insert a screwdriver blade or the like through aligned holes 328 in the face portions 320 to deflect the cantilever arm 132 and thereby the tongue 134 rearwardly and at the same time move the housing 300 upwardly.

Referring to FIG. 5, the second lock is provided by the interaction of plugs 350 with the hooks 118 of the support member 100 and the shaped surface surrounding the slots 322 in which the hooks are positioned. The plugs 350 are oval in shape and the upper end of each plug has a slot 352 formed therein. In addition, the plugs 350 are of a size to provide a friction fit with oval-shaped interior recesses 324 surrounding the slots 322. And when one of the plugs 350 is pressed into a recess 324, the bottom of the slot 352 underlies the hook 118 positioned within the associated slot 322. The plugs 350 thereby prevent the housing 300 from being moved upwardly to disengage the housing from the support member 100. Consequently, it is necessary to pry out the plugs 350 before the housing 300 can be removed from the support member 100.

Turning now to FIGS. 1 and 3, the cradle portion 330 of the housing 300 is shaped to accommodate the telephone handset 30 when the handset is not in use, the handset operating a hook switch plunger 332 when the handset is placed in the cradle portion. The cradle portion 330 serves as a cover for a cavity 360 within which circuit components of the telephone, such as the hook switch and ringer, are located, and in order to provide access to the cavity for servicing of these components, the cradle portion is secured so as to be removable without disassembly of any other portion of the telephone stand.

As shown most clearly in FIG. 1, the cradle portion 330 has a pair of laterally extending fingers 334 at its upper end that when positioned in complementary recesses 314 in the housing 300 properly locate the cradle portion with respect to the cavity 360. The cradle portion 330 is then secured in place by a pair of screws (not shown) that extend through holes in a center recess 335 and thread into holes in tabs 362, the screw heads being normally covered by an insert (not shown) that fills the recess. In addition, the cradle portion 330 is secured in place by a third screw (not shown) that extends through opening 336, seen in FIG. 3, in the lower end of the cradle portion and threads into a hole (not shown) in the underside of the housing 300.

The storage compartment 340, shown in FIG. 4, opens to the side opposite to the cradle portion 330 and is of a size to accommodate a telephone directory. To assist in removing the directory from the storage compartment 340, the bottom surface of the compartment advantageously includes a tray 345. The exposed end of the tray 345 has a downwardly extending lip 346 that can be grasped by the user to pull the tray and thereby the directory from the storage compartment 340.

Figure 6:
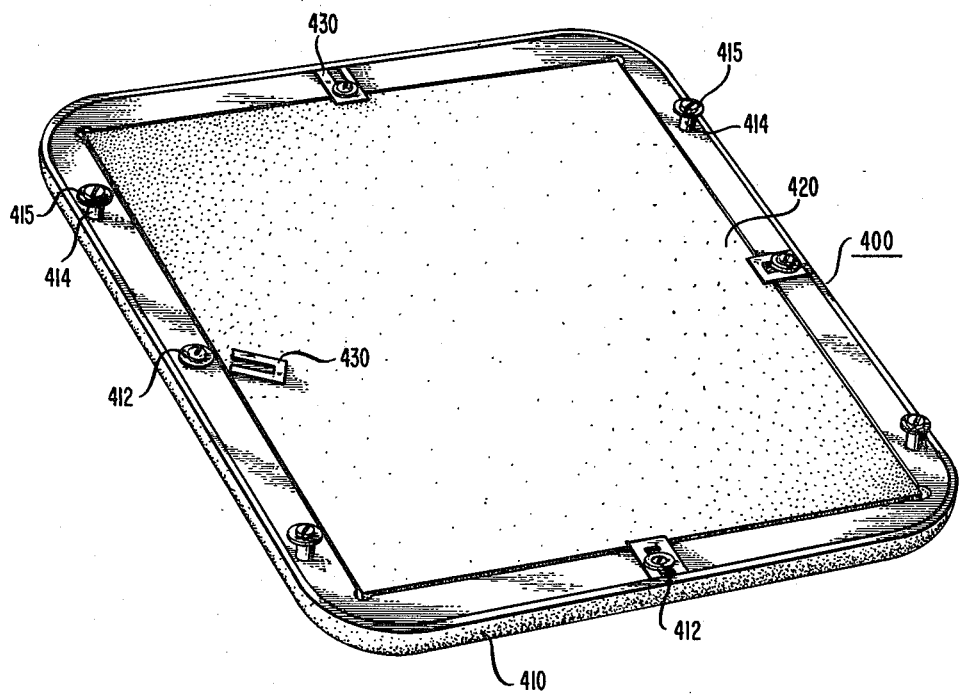
FIG. 6 is a perspective view showing the back of the display member.

Referring now to FIGS. 1 and 6, the last major component of the wall telephone stand is the display member 400. The display member 400 comprises a frame 410 and a display panel 420, such as a chalkboard 422 or a corkboard 424. As shown in FIG. 6, the display panel 420 is of a size to be accommodated within the frame 410 and is held in place by clips 430 that extend behind the panel and beneath the heads of screws 412 threaded into the back of the frame 410.

Figure 7:
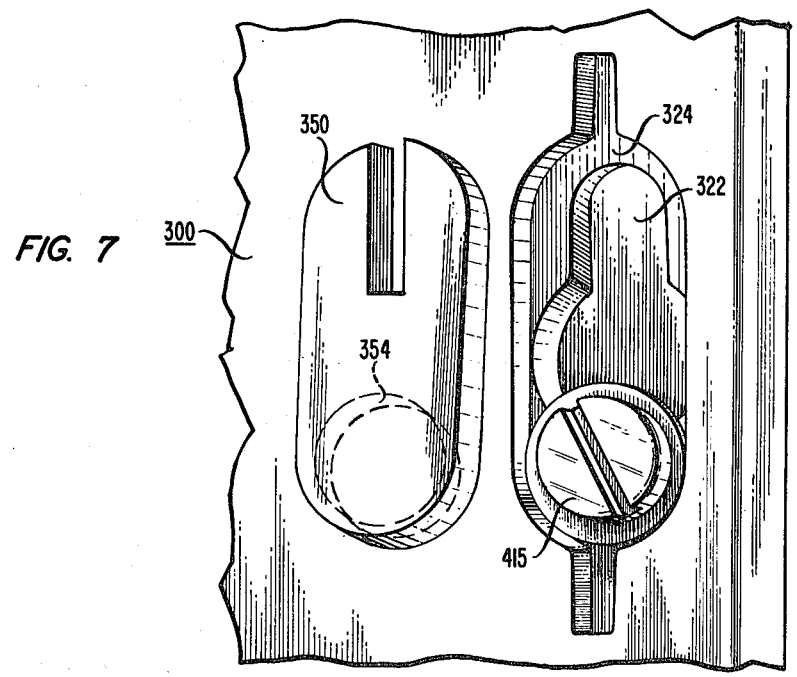
FIG. 7 is an enlarged partially exploded perspective view showing how the display member is mounted on the housing and showing a plug that is used to lock the display member in place.

In addition, the back of frame 410 has four posts 414 extending therefrom, the spacing of which is identical to the spacing of the slots 322 (FIGS. 3 and 4) in each face portion 320 of the housing 300. The posts 414 are of a size to be positioned within the narrow ends of the slots 322 and, referring also to FIG. 7, the posts are terminated by enlarged heads 415 of a size to pass through the circular centers of the slots.

Thus, the display member 400 is mounted on the housing 300 by positioning the display member in front of the housing with the heads 415 of the posts 414 in registration with the circular centers of the slots 322 in the adjacent face portion 320. The display member 400 is then moved against the housing 300, resulting in the heads 415 passing through the circular centers of the slots 322. Thereafter the display member 400 is moved downwardly, moving the heads 415 behind the narrower lower end of the slots 322 and thereby securing the display member 400 to the housing 300.

From the foregoing it is seen that the frame 410 and the display panel 420 of the display member 400 can be readily changed by the user of the telephone stand. Thus, for example, the corkboard 424 can be substituted for the chalkboard 422 or vice versa. Furthermore, the frame 410 can be in color or in woodgrain and it can be of any shape. Since the display member 400 occupies the front of the telephone stand it constitutes the dominant visual feature of the stand. But the display panel 420 is essentially neutral, and therefore it is the appearance of the frame 410, that is, its color, texture, and shape, that imparts a particular character to the telephone stand. Thus, the user of the telephone stand, by selecting the appropriate frame, can provide the telephone stand with an appearance that is compatible with contemporary, traditional, early American, or any other decor.

To prevent inadvertent dislodgement of the display member 400 from the housing 300, one face of the locking plugs 350 has a cylindrical depression 354 at its lower end that is of a size to accommodate the head 415 of a post 414. Thus, when the plugs 350 are pressed into the interior recesses 324 surrounding the slots 322, the cylindrical depressions in each plug encircle the adjacent head 415. The display member 400 is thereby blocked from being moved upwardly so as to disengage it from the housing 300 until the plugs 350 have been pried out.

I claim:

1. A wall telephone stand comprising a rear surface adapted to be mounted on a vertical support, a front surface including a message display portion, a cradle adjacent to the message display portion for accommodating a telephone handset, and a storage compartment situated between the front surface and the rear surface, the storage compartment being free of any electrical components and the storage compartment including a tray that is displaceable out from the storage compartment to assist in removing an article from the storage compartment.

2. A wall telephone stand comprising:
   a housing including a handset cradle on one side, a storage compartment open on the other side, and first and second exterior face portions extending between the sides, each face portion including a plurality of securing elements, securing elements of one face portion being identical to securing elements of the other face portion, said securing elements of both face portions having the same spatial arrangement;
   a support member for securing the housing to a wall, the support member having securing elements that are complementary to and have the same spatial arrangement as securing elements of the first and second face portions of the housing so that either face portion can be joined to the support member; and
   a display member having securing elements that are complementary to and have the same spatial relationship as securing elements of the first and second face portions of the housing so that the display member can be joined to the face portion of the housing not joined to the support member;
   whereby the location of the handset cradle and the storage compartment can be reversed by respectively reversing the face portions joined to the support member and the display member.

3. A telephone stand as in claim 2 wherein securing elements of the face portion comprise a slot having an enlarged center portion from which opposed narrow end portions extend, and securing elements of one of the members comprise a post having an enlarged head that is inserted through the enlarged center portion and into engagement with one of the narrow end portions to secure the member to the housing.

4. A telephone stand as in claim 2 wherein the face portions have exterior and interior surfaces and securing elements of the face portions comprise an elongated slot, the interior surface surrounding the slot having a groove adjacent each end of the slot, and securing elements of one of the members comprise an L-shaped hook that is inserted through the slot and into engagement with one of the grooves to secure the member to the housing.

5. A telephone stand as in claim 2, 3, or 4 wherein the face portions have exterior and interior surfaces, the interior surface surrounding at least one securing element of each face portion includes a recess, and each recess accommodates a locking member, the locking member being positioned in the recess subsequent to the engagement of the face portion securing element with a securing element of either the support member or the display member, and the locking member when so positioned locking the securing elements together.

6. A telephone stand as in claim 2, 3, or 4 wherein the support member comprises a wall plate having an opening in its middle and a forwardly extending rim disposed about its circumference, the securing elements of the support member extending forwardly from the rim.

7. A telephone stand as in claim 2, 3, or 4 wherein the display member comprises a display panel surrounded by a frame, the securing elements of the display member extending rearwardly from the frame.

8. A telephone stand as in claim 7 wherein the display member completely covers the face portion to which it is secured.

9. A wall telephone stand comprising a face portion, a handset receiving portion to one side of the face portion, and a storage compartment open to the other side of the face portion characterized in that the face portion only includes a message display, the display substantially occupying the entire face portion, and the handset receiving portion comprises a cover for a cavity within which circuit components of the telephone are located.

10. A telephone stand as in claim 9 wherein the handset receiving portion is recessed within the side of the housing, and includes a hook switch plunger.

11. A telephone stand as in claim 9 wherein the message display portion comprises a chalkboard.

12. A telephone stand as in claim 4 wherein an upper surface of the stand includes a well for keeping an eraser and chalk.

13. A telephone stand as in claim 9 wherein the display portion comprises a corkboard adapted to have notes tacked thereto.

14. A telephone stand as in claim 13 wherein an upper surface of the stand includes a well for keeping pencils and a note pad.

15. A telephone stand as in claim 9 wherein the display portion is surrounded by a frame that provides the telephone stand with a particular character and is selected to make the telephone stand compatible with the surroundings in which the telephone stand is to be placed.

16. A telephone stand as in claim 9 wherein the storage compartment includes a tray that is displaceable out from the storage compartment to assist in removing an article from the storage compartment.

17. A telephone stand comprising a rear support surface, a front display surface, a storage compartment open to one side of the display surface, and a handset receiving portion, the storage compartment opening and the handset receiving portion having reversible to provide whichever arrangement is most convenient for the user.

18. A telephone stand comprising a rear surface for supporting the telephone stand, a front surface including a display portion, a handset receiving portion on one side of the front surface, a storage compartment situated between the front and rear surface and open to the other side of the front surface, the handset receiving portion and the opening to the storage compartment being reversible to provide whichever arrangement is most convenient for the user.

* * * * *